United States Patent Office 3,300,327
Patented Jan. 24, 1967

3,300,327
COATING TO PREVENT HEAT SEALING OF POLYOLEFIN SURFACES
Richard L. Smith and Ronald K. Johnston, Kingsport, Tenn., assignors to Eastman Kodak Company, Rochester, N.Y., a corporation of New Jersey
No Drawing. Filed Feb. 18, 1963, Ser. No. 259,435
10 Claims. (Cl. 117—44)

This invention relates to coatings for polyolefin surfaces, and more particularly to coatings for polyolefin surfaces which prevent heat sealing of the polyolefin surfaces.

Frequently, it is desirable to coat polyethylene or other polyolefin surfaces to prevent heat sealing. For example, such coatings are highly useful on polyethylene coated carton blanks to selectively prevent heat sealing of the package in certain areas. A typical instance is polyethylene coated paper or cardboard cartons employed for packaging liquids such as milk, cream and juices. These cartons are generally extrusion coated with polyethylene and shipped as blanks to the packager where packaging machines form the cartons, heat weld the bottom, fill with the liquid and then heat weld the top. To facilitate reopening and pouring of the containers, the inner surface of the pouring lip may be given a coating to prevent sealing of the polyethylene surface during the heat welding treatment. The pouring lip of such containers is provided with a smooth moisture resistant surface over which the liquid may be poured. If such a coating is not applied to this area of the container, the polyethylene surfaces are sealed together during the heat welding operation. When the containers are opened, the polyethylene tears leaving a raw surface of paper or cardboard over which the liquid ingredients must be poured.

The coatings previously applied to polyolefin surfaces to prevent heat sealing have suffered from various disadvantages, such as difficulty of application or flaking off during routine handling.

One object of our invention is to prevent heat sealing of polyolefin surfaces. Another object of our invention is to provide coatings which may be easily applied to polyolefin surfaces and which do not flake off during handling. Still another object of our invention is to provide polyolefin coated paper and cardboard containers having a coating thereon which prevents heat sealing of these surfaces in predetermined areas, which coating is easy to apply and does not flake off during handling. Other objects of our invention will appear herein.

These and other objects of our invention are accomplished by coating polyolefin surfaces with a cellulose derivative selected from the group consisting of lower fatty acid esters of cellulose, the acyl groups of which contain 2–4 carbon atoms, ethyl cellulose and nitrocellulose, which cellulose derivatives are crosslinked with hexamethoxymethylmelamine. The hexamethoxymethylmelamine crosslinked cellulose derivatives provide coatings which prevent heat sealing of the polyolefin surfaces under normal heat-sealing conditions. The coatings of our invention are easy to apply. These coatings have good adhesion to polyolefin surfaces and do not flake off during normal handling of the polyolefin articles.

Our invention will be further illustrated by the following examples which show the coating of polyolefin surfaces with various cellulose esters and ethers, which cellulose derivatives are crosslinked with hexamethoxymethylmelamine.

Example 1

Milk cartons, extrusion coated with polyethylene, were coated with the following composition:

| | |
|---|---:|
| Cellulose acetate (39.8% acetyl) | 12.0 |
| Hexamethoxymethylmelamine | 4.0 |
| Acetone | 63.2 |
| Ethyl alcohol | 10.0 |
| Diacetone alcohol | 10.0 |
| 50% toluene sulfonic acid in n-butyl alcohol | 0.8 |
| | 100.0 |

After application, the lacquer was allowed to cure several days at room temperature. The parts of the surface which were not coated, as well as the coated parts, were contacted and subjected to a heat sealing treatment at 350° F. for 30 seconds under 30 lbs./sq. in. pressure. The uncoated surfaces of the polyethylene coated carton heat sealed while the parts which were coated did not seal. In addition, the coating did not flake off during the handling of the coated cartons.

Example 2

A milk carton blank extrusion coated with polyethylene was coated in spots with the following lacquer:

| | |
|---|---:|
| Half-second butyrate (37% butyryl, 2% OH) | 15.0 |
| Hexamethoxymethylmelamine | 5.0 |
| Ethyl alcohol | 10.0 |
| Isobutyl acetate | 15.0 |
| Toluene | 54.2 |
| 50% toluene sulfonic acid in n-butyl alcohol | 0.8 |
| | 100.0 |

The coating was cured at 200° F. for 15 minutes, and heat sealed in the same manner as in Example 1. The portions coated with the coating composition of the invention did not heat seal while the uncoated polyethylene surfaces were sealed by the treatment. The coating did not flake off during the handling of the carton blank.

Examples 3–6

Cellulose acetate propionate, ethyl cellulose, ethyl hydroxymethyl cellulose, and nitrocellulose were substituted for the cellulose acetate butyrate in Example 2 and subjected to the heat sealing treatment. The areas coated with these compositions did not heat seal during the sealing operation and the coatings did not flake off during handling.

The cellulose derivatives which are useful in coating polyolefin surfaces in accordance with our invention include the lower fatty acid esters of cellulose, the acyl groups of which contain 2–4 carbon atoms, ethyl cellulose, ethyl hydroxyethyl cellulose and nitrocellulose. The most useful cellulose derivatives in the practice of our invention are those which are soluble in organic solvents and which have free and reactive hydroxyl groups. Highly useful cellulose derivatives are cellulose acetate having an acyl content of about 37% to 40% and 3.0% to 5.5% hydroxyl; cellulose acetate butyrate having a butyryl content of 17% to 48% and a hydroxyl content of 0.7% to 2.5%; ethyl cellulose having an ethoxy content of 44.5% to 49.5%; and, nitrocellulose having a nitrogen content of 10.9 to 12.2.

Hexamethoxymethylmelamine may be incorporated with the cellulose derivatives in accordance with the invention in amounts up to about 50%. The general useful range of hexamethoxymethylmelamine, based on the weight of the cellulose derivative, is 5–40%, about 25% being the most advantageous.

Preferably, we incorporate an acid catalyst to facilitate the reaction between the hexamethoxymethylmelamine and the cellulose derivative. The toluene sulfonic acids provide extremely useful catalysts, p-toluene sulfonic acid being quite satisfactory. The amount of catalyst incorporated in the coatings employed in our invention may be varied over a considerable range, about 2% based on the total solids content of the lacquer (i.e., the combined weight of the hexamethoxymethylmelamine and cellulose derivative) being the most advantageous amount.

The coatings employed in our invention may contain plasticizer, pigment or other inert ingredients to modify the characteristics of the coating as desired.

The polyolefin surfaces may be advantageously coated in accordance with the invention with lacquer compositions which may be formulated with the cellulose derivative and hexamethoxymethylmelamine by dissolving in any suitable solvent system. A wide variety of organic solvents are useful, including solvents such as acetone, ethyl alcohol, diacetone alcohol, toluene, isobutyl acetate, methylene chloride, isobutyl alcohol, ethyl lactate, hexane, methyl isobutyl ketone and the like. The viscosity of these lacquers may be regulated as desired to provide the most useful coating compositions.

After the lacquer compositions employed in the invention have been coated on the polyolefin surface, it is desirable to cure the coating, i.e., effect a reaction between the cellulose derivative and hexamethoxymethylmelamine. The most advantageous conditions of the cure may vary from one cellulose derivative to another. For example, the cellulose acetate formula shown in Example 1 may be cured, as indicated, in the course of several days at room temperature, or the cure may be accelerated by heating such as to temperatures up to 350° F. for short periods of time. Cellulose acetate butyrate and hexamethoxymethylmelamine compositions are preferably cured at elevated temperatures which may vary from 200° F. for 15 minutes to about 350° F. for a short time, such as 30 seconds. Thus, the conditions of cure may be selected to suit the purposes of the particular operation.

It appears that the hexamethoxymethylmelamine reacts with free hydroxyl groups in the cellulose derivative molecules to form an ether linkage between the polymer and the hexamethoxymethylmelamine. The reaction with cellulose acetate is believed to occur as follows:

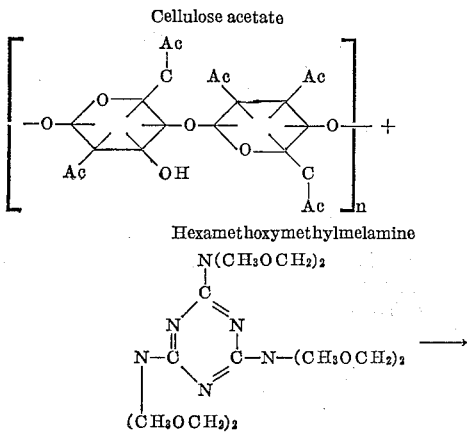

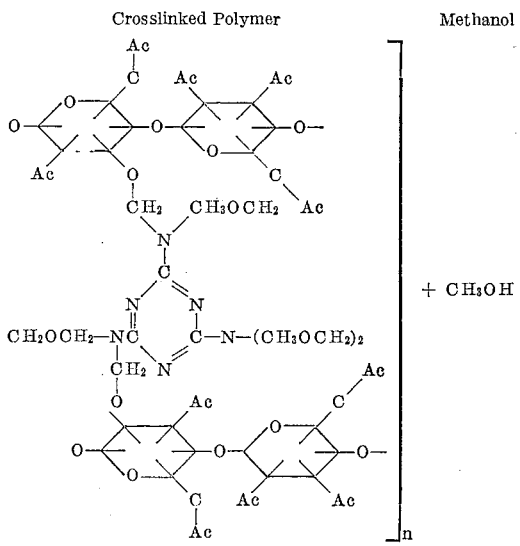

It is believed that a similar reaction occurs with the various other cellulose derivatives.

The coatings of our invention may be applied to polyolefin surfaces whenever it is desirable to prevent sealing of the surfaces which might be caused, for example, by heat and pressure. Thus, the coatings may be applied over the entire surface or on predetermined areas of the polyolefin surface to prevent sealing of films or shaped articles composed of polyolefins, such as polyethylene, polypropylene, polybutadiene, and the like.

As can be seen from the preceding disclosure, this invention provides, among other things, an article comprising a structure having a polyolefin surface with a coating thereon comprising a cellulose derivative selected from the group consisting of the lower fatty acid esters of cellulose, ethyl cellulose, ethyl hydroxyethyl cellulose and nitrocellulose, crosslinked with hexamethoxymethylmelamine.

As is also apparent from the above disclosure, an especially advantageous polyolefin is polyethylene.

The invention has been described in detail with particular reference to preferred embodiments thereof but it will be understood that variations and modifications can be effected within the spirit and scope of the invention as described hereinabove and as defined in the appended claims.

We claim:
1. An article comprising a structure having a polyolefin surface with a coating thereon comprising a cellulose derivative selected from the group consisting of the lower fatty acid esters of cellulose, ethyl cellulose, ethyl hydroxyethyl cellulose and nitrocellulose, crosslinked with hexamethoxymethylmelamine.

2. An article comprising a structure having a polyethylene surface with a coating thereon comprising a cellulose derivative selected from the group consisting of the lower fatty acid esters of cellulose, ethyl cellulose, ethyl hydroxyethyl cellulose and nitrocellulose, crosslinked with hexamethoxymethylmelamine.

3. An article comprising a polyethylene coated paper having coated on predetermined areas thereof a coating of cellulose acetate having an acyl content of about 37%–40% and 3.0%–5.0% free hydroxyl, crosslinked with 5%–40%, based on the weight of the cellulose acetate, of hexamethoxymethylmelamine.

4. An article comprising a polyethylene coated paper having coated on predetermined areas thereof a coating of cellulose acetate butyrate having a butyryl content of 17%–48% and 0.7%–2.5% free hydroxyl, said cellulose acetate butyrate being crosslinked with 5%–40%, based on the weight of the cellulose acetate butyrate, of hexamethoxymethylmelamine.

5. An article comprising a polyethylene coated paper having coated on predetermined areas therof a coating of ethyl cellulose having an ethoxy content of 44.5%–49.5% and 0.7%–2.5% free hydroxyl, said ethyl cellulose being crosslinked with 5%–40%, based on the weight of the ethyl cellulose, of hexamethoxymethylmelamine.

6. An article comprising a polyethylene coated paper having coated on predetermined areas thereof a coating of nitrocellulose having a combined nitrogen content of 10.9%–12.2% and 0.7%–2.5% free hydroxyl, said nitrocellulose being crosslinked with 5%–40%, based on the weight of the nitrocellulose, of hexamethoxymethylmelamine.

7. A receptacle suitable for packaging comprising the article of claim 1 in the form of an enclosure having polyolefin surfaces heat sealable by melt adhesion between uncoated polyolefin surfaces in mutual contact and readily openable between those polyolefin surfaces which have their mutual contact separated by said coating.

8. A receptacle suitable for packaging comprising the article of claim 2 in the form of an enclosure having polyethylene surfaces heat sealable by melt adhesion between uncoated polyethylene surfaces in mutual contact and readily openable between those polyethylene surfaces which have mutual contact separated by said coating.

9. A packaged commodity in a receptacle comprising the article of claim 1 in the form of an enclosure having polyolefin surfaces heat sealed by melt adhesion between uncoated polyolefin surfaces in mutual contact and readily openable between those polyolefin surfaces which have their mutual contact separated by said coating.

10. A packaged commodity in a receptacle comprising the article of claim 2 in the form of an enclosure having polyethylene surfaces heat sealed by melt adhesion between uncoated polyethylene surfaces in mutual contact and readily openable between those polyethylene surfaces which have their mutual contact separated by said coating.

References Cited by the Examiner

UNITED STATES PATENTS

| 2,371,768 | 3/1945 | Malm et al. | 106—186 |
| 3,066,848 | 12/1962 | Billeb | 117—44 |
| 3,101,279 | 8/1963 | Wagner et al. | 260—212 |

OTHER REFERENCES

Textile Research Journal, vol. 30, No. 12, December 1960, pages 930 to 953.

American Dyestuff Reporter, vol. 51, No. 17, Aug. 20, 1962 (pages 36 to 39).

RALPH S. KENDALL, *Primary Examiner.*

ALFRED LEAVITT, A. H. ROSENSTEIN,
*Assistant Examiners.*